United States Patent [19]

Kotera et al.

[11] Patent Number: 4,512,911
[45] Date of Patent: Apr. 23, 1985

[54] PHOSPHOR

[75] Inventors: Noboru Kotera; Shusaku Eguchi, both of Odawara; Norio Miura, Isehara, all of Japan

[73] Assignee: Kasei Optonix, Ltd., Japan

[21] Appl. No.: 533,949

[22] Filed: Sep. 20, 1983

Related U.S. Application Data

[63] Continuation of Ser. No. 442,765, Nov. 10, 1982, abandoned, which is a continuation of Ser. No. 159,848, Jun. 16, 1980, abandoned.

[30] Foreign Application Priority Data

Jun. 19, 1979 [JP] Japan .................................. 54-77290
Jun. 19, 1979 [JP] Japan .................................. 54-77291

[51] Int. Cl.³ ............................................ C09K 11/467
[52] U.S. Cl. ............................................ 252/301.4 H
[58] Field of Search ................................ 252/301.4 H

[56] References Cited

FOREIGN PATENT DOCUMENTS 21342    1/1981  European Pat. Off. ..... 252/301.4 H
55-23115 2/1980  Japan ........................... 252/301.4 H

*Primary Examiner*—Jack Cooper
*Attorney, Agent, or Firm*—Gerald J. Ferguson, Jr.; Joseph J. Baker

[57] ABSTRACT

A rare earth element activated complex halide phosphor represented by the formula $$BaF_2 \cdot aBaX_2 \cdot bMgF_2 \cdot cMe^{I}F \cdot dMe^{II}F_2 \cdot eMe^{III}F_3 : fLn$$

wherein X is at least one halogen selected from the group consisting of Cl, Br and I, $Me^{I}$ is at least one alkali metal selected from the group consisting of Li and Na, $Me^{II}$ is at least one divalent metal selected from the group consisting of Be, Ca and Sr, $Me^{III}$ is at least one trivalent metal selected from the group consisting of Al, Ga, Y and La, Ln is at least one rare earth element selected from the group consisting of Eu, Ce and Tb, and a, b, c, d, e and f are numbers satisfying the conditions of $0.90 \leq a \leq 1.05$, $0 \leq b \leq 1.2$, $0 \leq c \leq 0.9$, $0 \leq d \leq 1.2$, $0 \leq e \leq 0.03$, $10^{-6} \leq f \leq 0.03$ and $c+d+e \neq 0$. The phosphor emits light of high luminance when stimulated by light of wavelength ranging from 450 to 800 nm after exposure to ionizing radiations, ultraviolet rays, cathode rays, or the like. Further, the phosphor emits thermoluminescent light of high luminance when heated after exposure to ionizing radiations, ultraviolet rays, cathode rays, or the like.

5 Claims, 6 Drawing Figures

PHOSPHOR

This is a continuation of application Ser. No. 442,765, filed Nov. 10, 1982, which in turn is a continuation of application Ser. No. 159,848, filed June 16, 1980, both now abandoned.

BACKGROUND OF THE INVENTION

1. Field of the Invention

This invention relates to a phosphor, and more particularly to a rare earth element activated complex halide phosphor.

2. Description of the Prior Art

Some kinds of phosphors emit fluorescent light when exposed to (excited by) visible light or infrared rays after exposure to ionizing radiations, ultraviolet rays, cathode rays, or the like. This kind of excitation is referred to as "stimulation", and the phosphor which emits fluorescent light upon stimulation is referred to as "stimulable phosphor". It is known that a stimulable phosphor can be used for a radiation image storage panel. That is, a radiation image of an object can be obtained by causing a panel composed of a stimulable phosphor to absorb a radiation passing through the object, exposing the panel to visible light or infrared rays to cause the stimulable phosphor to release the energy of the radiation stored therein as fluorescent light, and then detecting the fluorescent light.

In most cases of practical use of a radiation image storage panel, the object of the image is a human body. Accordingly, particularly when ionizing radiations such as X-rays or γ-rays are used, it is required for a stimulable phosphor employed in the radiation image storage panel to emit light of as high luminance as possible upon stimulation thereof to decrease a dose of ionizing radiations to which the object is exposed.

As a stimulable phosphor, a rare earth element activated barium fluorohalide phosphor represented by the following formula has been known in the art (see U.S. patent application Ser. No. 57,091);

BaFX:yLn wherein X is at least one halogen selected from the group consisting of chlorine, bromine and iodine, Ln is at least one rare earth element selected from the group consisting of europium, cerium and terbium, and y is a number satisfying the condition of $0 \leq y \leq 0.2$.

Further, it has been known that a rare earth element activated barium fluorohalide phosphor represented by the following formula emits light of high luminance upon stimulation thereof;

$BaF_2 \cdot aBaX_2 : zLn$ wherein X and Ln have the same definitions as the above, and a and z are numbers satisfying the conditions of $0.90 \leq a \leq 1.05$ and $0 \leq z \leq 0.4$, respectively. When a and z are $a=1$ and $0 \leq z \leq 0.2$, respectively, the phosphor corresponds to the above-mentioned rare earth element activated barium fluorohalide phosphor described in U.S. patent application Ser. No. 57,091.

Furthermore, it has been known that a rare earth element activated barium magnesium fluorohalide represented by the following formula emits light of high luminance upon stimulation thereof;

$BaF_2 \cdot aBaX_2 \cdot bMgF_2 : fLn$ wherein X and Ln have the same definitions as the above, and a, b and f are numbers satisfying the conditions of $0.90 \leq a \leq 1.05$, $0 \leq b \leq 1.2$ and $10^{-6} \leq f \leq 0.03$, respectively.

As is clear from the above description, it has heretofore been known that a rare earth element activated divalent metal fluorohalide phosphor represented by the following formula emits light of high luminance upon stimulation thereof;

$BaF_2 \cdot aBaX_2 \cdot bMgF_2 : fLn$ wherein X is at least one halogen selected from the group consisting of chlorine, bromine and iodine, Ln is at least one rare earth element selected from the group consisting of europium, cerium and terbium, and a, b and f are numbers satisfying the conditions of $0.90 \leq a \leq 1.05$, $0 \leq b \leq 1.2$ and $10^{-6} \leq f \leq 0.03$, respectively. When the above rare earth element activated divalent metal fluorohalide phosphor is employed in a radiation image storage panel, in view of the above-mentioned circumstances, the phosphor is desired to emit light of as high luminance as possible upon stimulation thereof.

SUMMARY OF THE INVENTION

Therefore, an object of the present invention is to enhance the luminance of light emitted by the above-mentioned rare earth element activated divalent metal fluorohalide phosphor upon stimulation thereof.

In order to accomplish the above object, the inventors of the present invention conducted various investigations in the above-mentioned rare earth element activated divalent metal fluorohalide phosphor. As a result of the investigations, it was found that the luminance of light emitted by the rare earth element activated divalent metal fluorohalide phosphor upon stimulation thereof was enhanced by incorporating in the phosphor at least one fluoride selected from the group consisting of specific alkali metal fluorides, specific divalent metal fluorides and specific trivalent metal fluorides in a proper amount as the constituent of the host material of the phosphor.

The phosphor of the present invention is a rare earth element activated complex halide phosphor represented by the formula $BaF_2 \cdot aBaX_2 \cdot bMgF_2 \cdot cMe^{I}F \cdot dMe^{II}F_2 \cdot eMe^{III}F_3 : fLn$ wherein X is at least one halogen selected from the group consisting of chlorine, bromine and iodine, $Me^{I}$ is at least one alkali metal selected from the group consisting of lithium and sodium, $Me^{II}$ is at least one divalent metal selected from the group consisting of beryllium, calcium and strontium, $Me^{III}$ is at least one trivalent metal selected from the group consisting of aluminum, gallium, yttrium and lanthanum, Ln is at least one rare earth element selected from the group consisting of europium, cerium and terbium, and a, b, c, d, e and f are numbers satisfying the conditions of $0.90 \leq a \leq 1.05$, $0 \leq b \leq 1.2$, $0 \leq c \leq 0.9$, $0 \leq d \leq 1.2$, $0 \leq e \leq 0.03$, $10^{-6} \leq f \leq 0.03$ and $c+d+e \neq 0$. From the viewpoint of the luminance of light emitted by the phosphor upon stimulation thereof, when $b=0$, the numbers a, c, d, e and f should preferably satisfy the conditions of $0.95 \leq a \leq 1.02$, $0.01 \leq c \leq 0.5$, $0.01 \leq d \leq 0.2$, $0.0005 \leq e \leq 0.01$ and $10^{-4} \leq f \leq 0.01$, respectively, and when $b \neq 0$, the numbers a, b, c, d, e and f should preferably satisfy the conditions of $0.95 \leq a \leq 1.02$, $0.005 \leq b \leq 0.2$, $0.01 \leq c \leq 0.2$, $0.001 \leq d \leq 0.1$, $0.0005 \leq e \leq 0.01$ and $10^{-4} \leq f \leq 0.01$, respectively. (The phosphor of the present invention wherein $b=0$ and the other phosphor of the present invention wherein $b \neq 0$ are hereinafter referred to as "Phosphor-I" and "Phosphor-II", respectively.)

The phosphor of the present invention emits light of higher luminance than the conventional rare earth element activated divalent metal fluorohalide phosphor when it is stimulated by light of wavelength ranging from 450 to 800 nm afer exposure to ionizing radiations such as X-rays or γ-rays, ultraviolet rays, cathode rays, or the like. Further, the phosphor of the present invention is a thermoluminescent phosphor and therefore, emits light of high luminance when heated after exposure to ionizing radiations, ultraviolet rays, cathode rays, or the like.

DETAILED DESCRIPTION OF THE INVENTION

The present invention will hereinbelow be described in detail.

The phosphor of the present invention is prepared by the following process.

The following raw materials are used;

(i) barium fluoride ($BaF_2$), (ii) magnesium fluoride ($MgF_2$), (iii) at least one barium halide selected from the group consisting of barium chloride ($BaCl_2$), barium bromide ($BaBr_2$) and barium iodide ($BaI_2$), (iv) at least one fluoride selected from the group consisting of lithium fluoride (LiF), sodium fluoride (NaF), beryllium fluoride ($BeF_2$), calcium fluoride ($CaF_2$), strontium fluoride ($SrF_2$), aluminum fluoride ($AlF_3$), gallium fluoride ($GaF_3$), yttrium fluoride ($YF_3$) and lanthanum fluoride ($LaF_3$), and (v) at least one rare earth element compound selected from the group consisting of europium compounds, cerium compounds and terbium compounds such as chloride, fluoride, bromide, nitrate, oxide, and the like.

The above-mentioned raw materials are weighed out in such a ratio that a raw material mixture stoichiometrically represented by the following formula is obtained, and mixed well by means of a ball mill, a mixer mill, or the like;

$BaF_2.aBaX_2.bMgF_2.cMe^{I}F.dMe^{II}F_2.eMe^{III}F_3:fLn$ wherein X is at least one halogen selected from the group consisting of chlorine, bromine and iodine, $Me^{I}$ is at least one alkali metal selected from the group consisting of lithium and sodium, $Me^{II}$ is at least one divalent metal selected from the group consisting of beryllium, calcium and strontium, $Me^{III}$ is at least one trivalent metal selected from the group consisting of aluminum, gallium, yttrium, and lanthanum, Ln is at least one rare earth element selected from the group consisting of europium, cerium and terbium, and a, b, c, d, e and f are numbers satisfying the conditions of $0.90 \leq a \leq 1.05$, $0 \leq b \leq 1.2$, $0 \leq c \leq 0.9$, $0 \leq d \leq 1.2$, $0 \leq e \leq 0.03$, $10^{-6} \leq f \leq 0.03$ and $c+d+e \neq 0$. It is needless to say that when $b=0$, the raw material ii) is not used.

Then, the raw material mixture is put into a heat-resistant container such as an alumina crucible, a quartz crucible, or the like and fired in an electric furnace. The firing is performed at a temperature ranging from 600° to 1000° C., preferably ranging from 700° to 900° C. Although the firing period is determined depending upon the amount of the raw material mixture placed in the heat-resistant container, the firing temperature employed and so forth, the firing period is generally within the range of 1 to 6 hours. Although the firing may be performed in the air, the firing is preferably performed in an inert atmosphere such as an argon gas atmosphere or a nitrogen gas atmosphere, or in a weak reducing atmosphere such as a nitrogen gas atmosphere containing a small amount of hydrogen gas or a carbon vapor atmosphere. Among the phosphors included in the rare earth element activated complex halide phosphor of the present invention, the phosphor activated with divalent europium is very useful practically. In the preparation of the phosphor, a compound of trivalent europium is used as a new material of europium, and the trivalent europium is reduced to divalent europium during the firing. Accordingly, when the phosphor activated with divalent europium is prepared, the firing should be performed in a weak reducing atmosphere. The luminance of light emitted by the phosphor of the present invention can further be enhanced by firing the raw material mixture under the firing conditions mentioned above, taking out the fired product from the furnace, pulverizing the fired product and then refiring the pulverized product under the same firing conditions. After the firing, the fired product is subjected to the processes generally employed in the production of a phosphor such as pulverizing and sieving to obtain the phosphor of the present invention.

The rare earth element activated complex halide phosphor of the present invention thus prepared exhibits emission of higher luminance than the conventional rare earth element activated divalent metal fluorohalide phosphor upon stimulation thereof. Further, the phosphor of the present invention exhibits thermoluminescence of high luminance.

Figure 1:
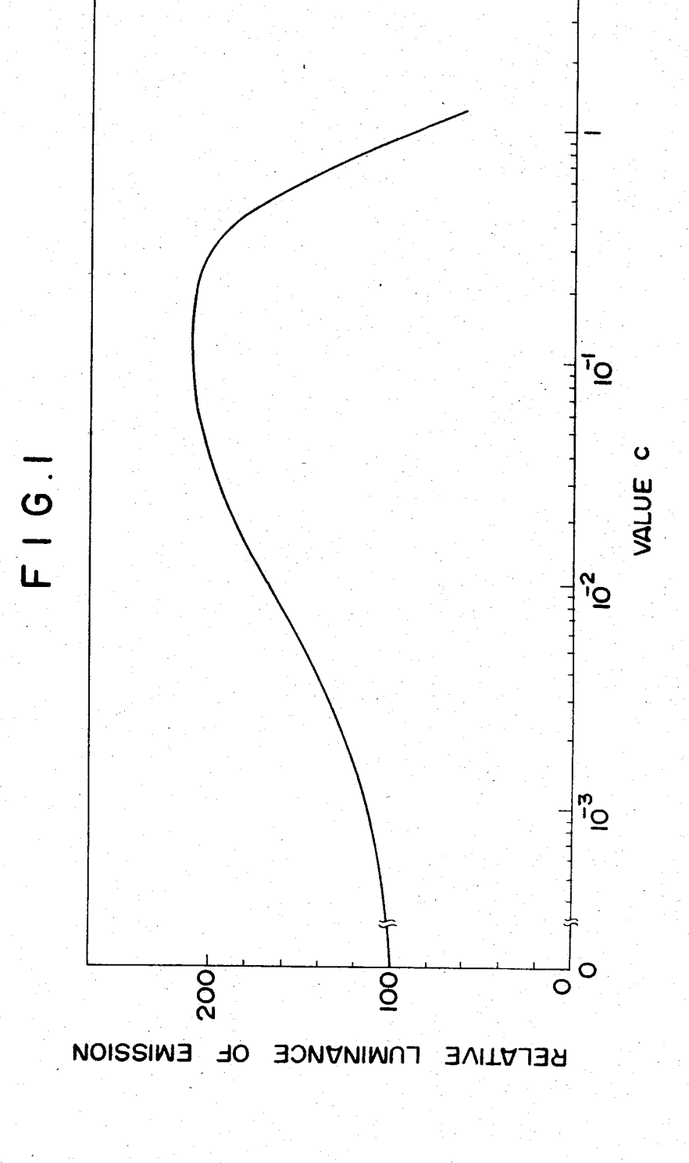
FIG. 1 is a graph showing the relationship between the value c of the $BaF_2.BaX_2.cMe^{I}F:0.0005Ln$ phosphor of the present invention and the luminance of light emitted by the phosphor upon stimulation thereof.
Figure 2:
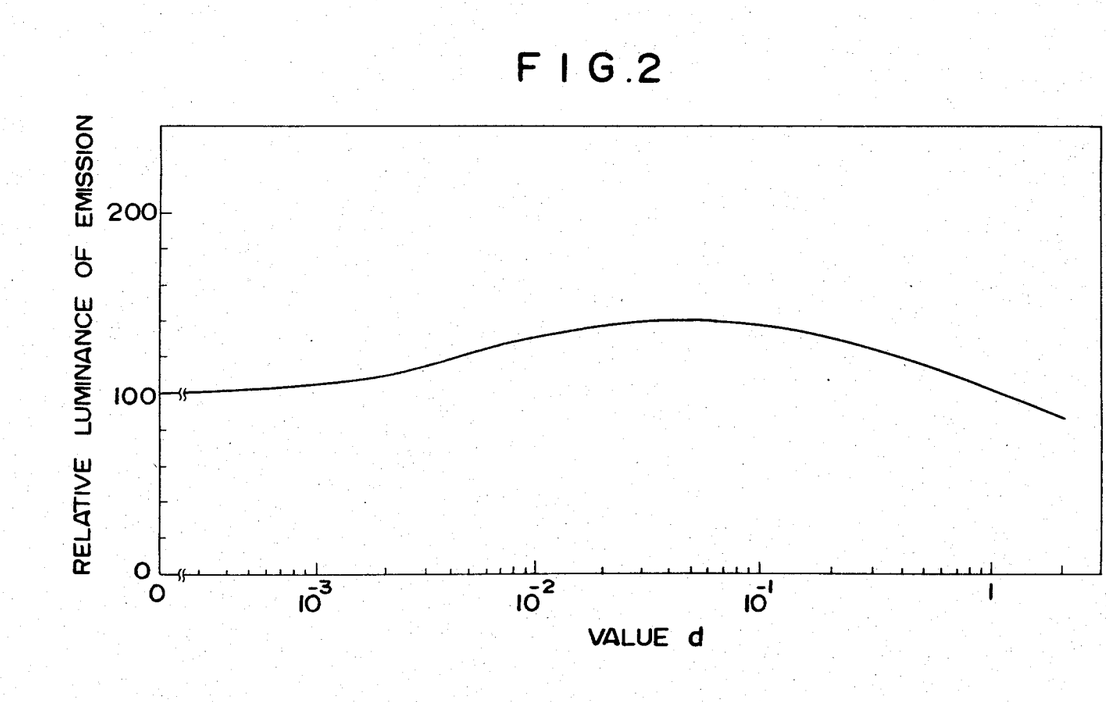
FIG. 2 is a graph showing the relationship between the value d of the $BaF_2.BaX_2.dMe^{II}F_2:0.0005Ln$ phosphor of the present invention and the luminance of light emitted by the phosphor upon stimulation thereof.
Figure 3:
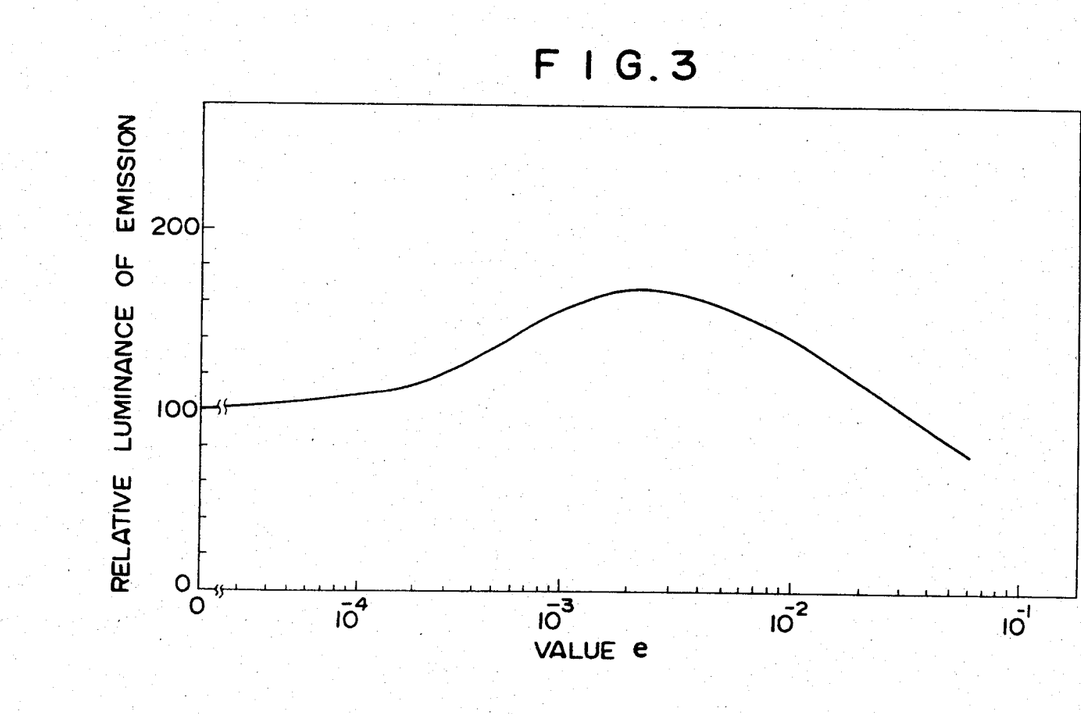
FIG. 3 is a graph showing a relationship between value e of the $BaF_2.BaX_2.eMe^{III}F_3:0.0005Ln$ phosphor of the present invention and the luminance of light emitted by the phosphor upon stimulation thereof.

Referring to FIGS. 1, 2 and 3, the amounts of $Me^I F$, $Me^{II} F_2$, and $Me^{III} F_3$ (viz., values c, d and e, respectively) of Phosphor-I of the present invention will hereinbelow be described.

FIG. 1 is a graph showing the relationship between the amount of $Me^I F$ (value c) of the $BaF_2 \cdot BaX_2 \cdot cMe^I F : 0.0005 Ln$ phosphor included in Phosphor-I and the luminance of light emitted by the phosphor upon stimulation thereof. The data shown in FIG. 1 is one measured for the phosphor wherein X, $Me^I$ and Ln are bromine, lithium and divalent europium, respectively (viz., the $BaF_2 \cdot BaBr_2 \cdot cLiF : 0.0005 Eu^{2+}$ phosphor). The measurement of the luminance was performed by exposing the phosphor to X-rays of 80 KVp, and then stimulating the phosphor with light of 630 nm which was obtained by causing the light emitted by a xenon lamp in a spectroscope to pass through a diffraction grating. In FIG. 1, the luminance of emission (ordinate axis) is represented by the relative value with respect to that of the conventional $BaF_2 \cdot BaX_2 : 0.0005 Ln$ phosphor in which $Me^I F$ is not incorporated (viz., the $BaF_2 \cdot BaBr_2 : 0.0005 Eu^{2+}$ phosphor) defined to be 100.

As is clear from FIG. 1, when the value c is $0 < c \leq 0.9$, the $BaF_2 \cdot BaX_2 \cdot cMe^I F : 0.0005 Ln$ phosphor emits light of higher luminance than the conventional $BaF_2 \cdot BaX_2 : 0.0005 Ln$ phosphor upon stimulation thereof. In particular, when the value c is $0.01 \leq c \leq 0.5$, the $BaF_2 \cdot BaX_2 \cdot cMe^I F : 0.0005 Ln$ phosphor emits light of markedly high luminance upon stimulation thereof.

Although FIG. 1 shows the data measured for the $BaF_2 \cdot BaBr_2 \cdot cLiF : 0.0005 Eu^{2+}$ phosphor as described above, it was confirmed that the results similar to that shown in FIG. 1 were also obtained with respect to other phosphors included in the $BaF_2 \cdot BaX_2 \cdot cMe^I F : 0.0005 Ln$ phosphor. Further, it was confirmed that the results similar to that shown in FIG. 1 were also obtained with respect to other phosphors included in Phosphor-I wherein $Me^{II} F_2$ and/or $Me^{III} F_3$ was incorporated together with $Me^I F$.

FIG. 2 is a graph showing the relationship between the amount of $Me^{II} F_2$ (value d) of the $BaF_2 \cdot BaX_2 \cdot dMe^{II} F_2 : 0.0005 Ln$ phosphor included in Phosphor-I and the luminance of light emitted by the phosphor upon stimulation thereof. The data shown in FIG. 2 is one measured for the phosphor wherein X, $Me^{II}$ and Ln are bromine, calcium and divalent europium, respectively (viz., the $BaF_2 \cdot BaBr_2 \cdot dCaF_2 : 0.0005 Eu^{2+}$ phosphor). The measurement of the luminance was performed in the same manner as described in FIG. 1. In FIG. 2, the luminance of emission (ordinate axis) is represented by the relative value with respect to that of the conventional $BaF_2 \cdot BaX_2 : 0.0005 Ln$ phosphor in which $Me^{II} F_2$ is not incorporated (viz., the $BaF_2 \cdot BaBr_2 : 0.0005 Eu^{2+}$ phosphor) defined to be 100.

As is clear from FIG. 2, when the value d is $0 < d \leq 1.2$, the $BaF_2 \cdot BaX_2 \cdot dMe^{II} F_2 : 0.0005 Ln$ phosphor emits light of higher luminance than the conventional $BaF_2 \cdot BaX_2 : 0.0005 Ln$ phosphor upon stimulation thereof. In particular, when the value d is $0.01 \leq d \leq 0.2$, the $BaF_2 \cdot BaX_2 \cdot dMe^{II} F_2 : 0.0005 Ln$ phosphor emits light of markedly high luminance upon stimulation thereof.

Although FIG. 2 shows the data measured for the $BaF_2 \cdot BaBr_2 \cdot cCaF_2 : 0.0005 Eu^{2+}$ phosphor as described above, it was confirmed that the results similar to that shown in FIG. 2 were also obtained with respect to other phosphors included in the $BaF_2 \cdot BaX_2 \cdot dMe^{II} F_2 : 0.0005 Ln$ phosphor. Further, it was confirmed that the results similar to that shown in FIG. 2 were also obtained with respect to other phosphors included in Phosphor-I wherein $Me^I F$ and/or $Me^{III} F_3$ was incorporated together with $Me^{II} F_2$.

FIG. 3 is a graph showing the relationship between the amount of $Me^{III} F_3$ (value e) of the $BaF_2 \cdot BaX_2 \cdot eMe^{III} F_3 : 0.0005 Ln$ phosphor included in Phosphor-I and the luminance of light emitted by the phosphor upon stimulation thereof. The data shown in FIG. 3 is one measured for the phosphor wherein X, $Me^{III}$ and Ln are bromine, aluminum and divalent europium, respectively (viz., the $BaF_2 \cdot BaBr_2 \cdot eAlF_3 : 0.0005 Eu^{2+}$ phosphor). The measurement of the luminance of emission was performed in the same manner as described in FIG. 1. In FIG. 3, the luminance of emission (ordinate axis) is represented by the relative value with respect to that of the conventional $BaF_2 \cdot BaX_2 : 0.0005 Ln$ phosphor in which $Me^{III} F_3$ is not incorporated (viz., the $BaF_2 \cdot BaBr_2 : 0.0005 Eu^{2+}$ phosphor) defined to be 100.

As is clear from FIG. 3, when the value e is $0 \leq e \leq 0.03$, the $BaF_2 \cdot BaX_2 \cdot eMe^{III} F_3 : 0.0005 Ln$ phosphor emits light of higher luminance than the conventional $BaF_2 \cdot BaX_2 : 0.0005 Ln$ phosphor upon stimulation thereof. In particular, when the value e is $0.0005 \leq e \leq 0.01$, the $BaF_2 \cdot BaX_2 \cdot eMe^{III} F_3 : 0.0005 Ln$ phosphor emits light of markedly high luminance upon stimulation thereof.

Although FIG. 3 shows the data measured for the $BaF_2 \cdot BaBr_2 \cdot eAlF_3 : 0.0005 Eu^{2+}$ phosphor as described above, it was confirmed that the results similar to that shown in FIG. 3 were also obtained with respect to other phosphors included in the $BaF_2 \cdot BaX_2 \cdot eMe^{III} F_3 : 0.0005 Ln$ phosphor. Further, it was confirmed that the results similar to that shown in FIG. 3 were also obtained with respect to other phosphors included in Phosphor-I wherein $Me^I F$ and/or $Me^{II} F_2$ was incorporated together with $Me^{III} F_3$.

From the above description referring to FIGS. 1 to 3, it is concluded that the values c, d and e of Phosphor-I are numbers satisfying the conditions of $0 \leq c \leq 0.9$, $0 \leq d \leq 1.2$, $0 \leq e \leq 0.03$ and $c + d + e \neq 0$. The numbers c, d and e should preferably satisfy the conditions of $0.01 \leq c \leq 0.5$, $0.01 \leq d \leq 0.2$ and $0.0005 \leq e \leq 0.01$, respectively.

Figure 4:
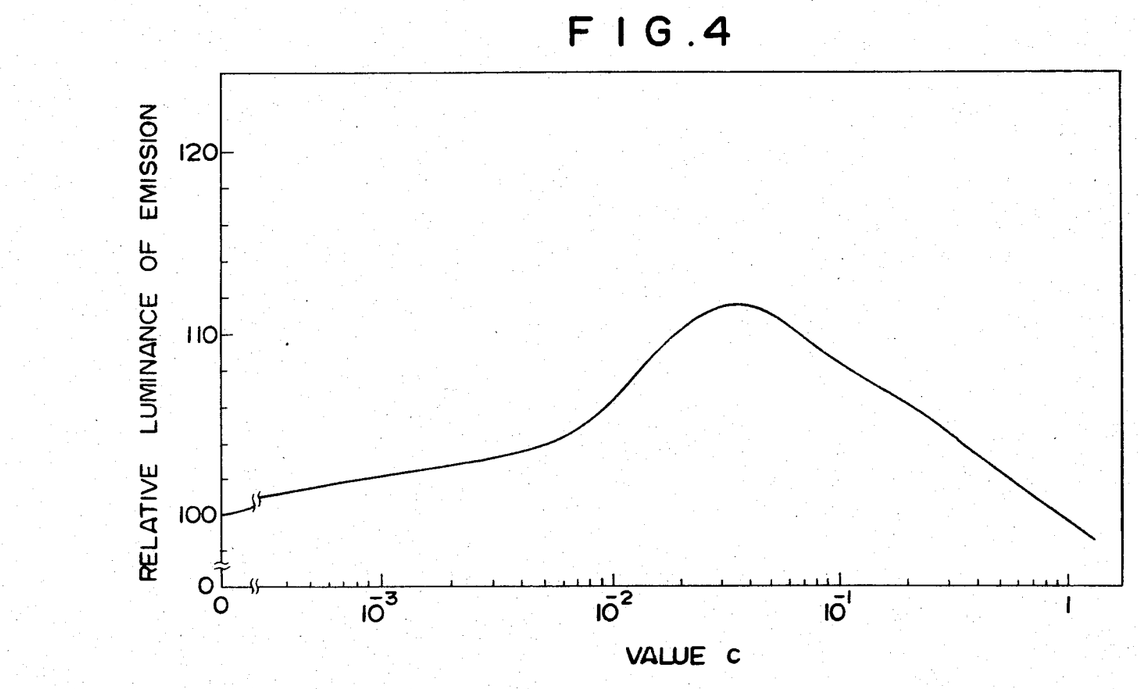
FIG. 4 is a graph showing a relationship between the value c of the $BaF_2.BaX_2.0.02MgF_2.cMe^{I}F:0.0005Ln$ phosphor of the present invention and the luminance of light emitted by the phosphor upon stimulation thereof.
Figure 5:
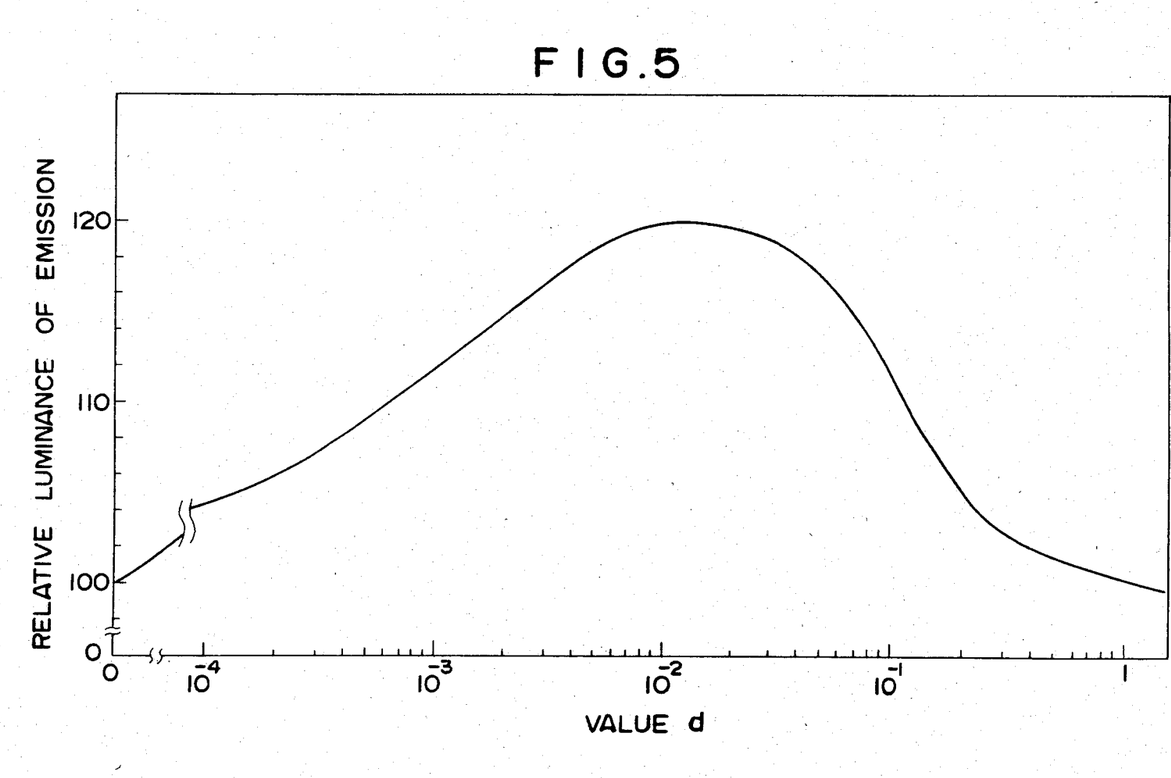
FIG. 5 is a graph showing a relationship between the value d of the $BaF_2.BaX_2.0.02MgF_2.dMe^{II}F_2:0.0005Ln$ phosphor of the present invention and the luminance of light emitted by the phosphor upon stimulation thereof.
Figure 6:
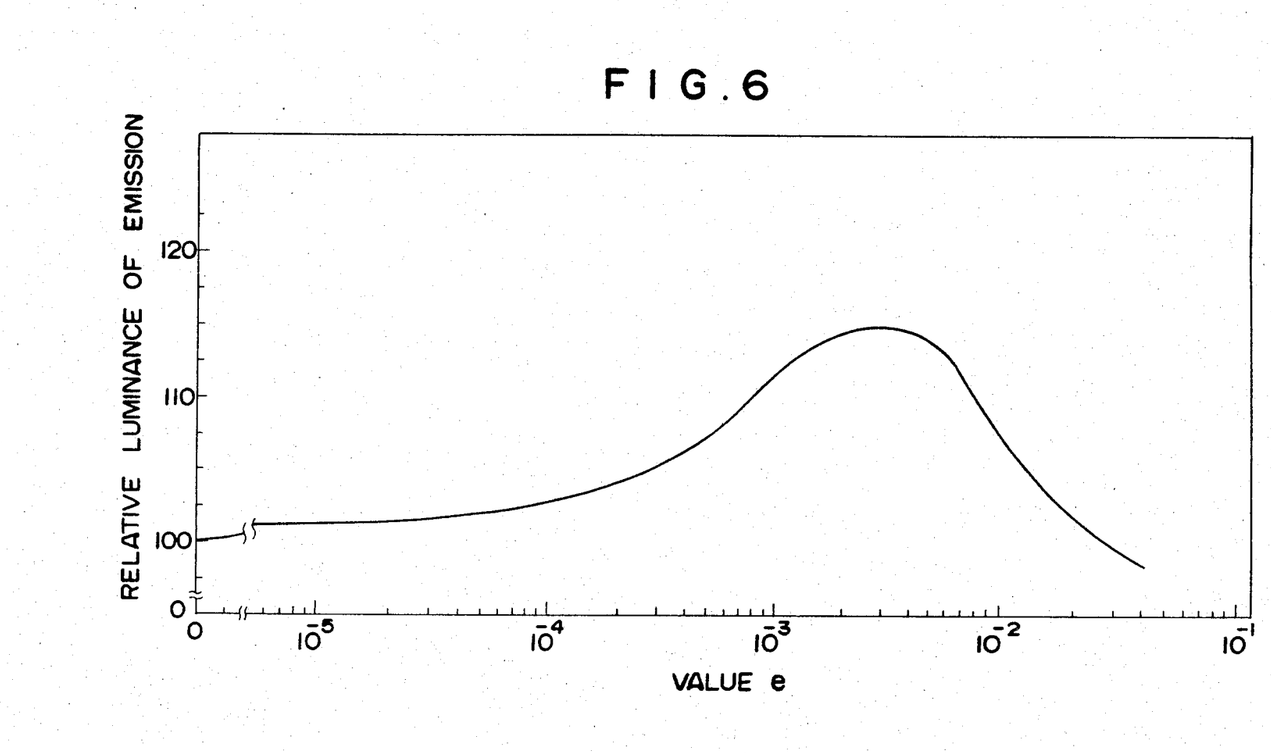
FIG. 6 is a graph showing a relationship between the value e of the $BaF_2.BaX_2.0.045MgF_2.eMe^{III}F_3:0.0005Ln$ phosphor of the present invention and the luminance of light emitted by the phosphor upon stimulation thereof.

Referring to FIGS. 4, 5 and 6, the amounts of $Me^I F$, $Me^{II} F_2$ and $Me^{III} F_3$ (viz., values c, d and e, respectively) of Phosphor-II of the present invention will hereinbelow be described.

FIG. 4 is a graph showing the relationship between the amount of $Me^I F$ (value c) of the $BaF_2 \cdot BaX_2 \cdot 0.02 MgF_2 \cdot cMe^I F : 0.0005 Ln$ phosphor included in Phosphor-II and the luminance of light emitted by the phosphor upon stimulation thereof. The data shown in FIG. 4 is one measured for the phosphor wherein X, $Me^I$ and Ln are bromine, lithium and divalent europium, respectively (viz., the $BaF_2 \cdot BaBr_2 \cdot 0.02 MgF_2 \cdot cLiF : 0.0005 Eu^{2+}$ phosphor). The measurement of the luminance of emission was performed in the same manner as described in in FIG. 1. In FIG. 4, the luminance of emission (ordinate axis) is represented by the relative value with respect to that of the conventional $BaF_2 \cdot BaX_2 \cdot 0.02 MgF_2 : 0.0005 Ln$ phosphor in which $Me^I F$ is not incorporated (viz., the $BaF_2 \cdot BaBr_2 \cdot 0.02 MgF_2 : 0.0005 Eu^{2+}$ phosphor) defined to be 100.

As is clear from FIG. 4, when the value c is $0 \leq c \leq 0.9$, the $BaF_2 \cdot BaX_2 \cdot 0.02 MgF_2 \cdot cMe^I F : 0.005 Ln$ phosphor emits light of higher luminance than the conventional $BaF_2 \cdot BaX_2 \cdot 0.02 MgF_2 : 0.0005 Ln$ phosphor upon stimulation thereof. In particular, when the value c is $0.01 \leq c \leq 0.2$, the $BaF_2.BaX_2.0.02MgF_2.cMe^IF:0.0005Ln$ phosphor emits light of markedly high luminance upon stimulation thereof.

Although FIG. 4 shows the data measured for the $BaF_2.BaX_2.0.02MgF_2.cLiF:0.0005Eu^{2+}$ phosphor as described above, it was confirmed that the results similar to that shown in FIG. 4 were also obtained with respect to other phosphors included in the $BaF_2.BaX_2.0.02MgF_2.cMe^IF:0.0005Ln$ phosphor. Further, it was confirmed that the results similar to that shown in FIG. 4 were also obtained with respect to other phosphors included in Phosphor-II wherein $Me^{II}F_2$ and/or $Me^{III}F_3$ was incorporated together with $Me^IF$.

FIG. 5 is a graph showing the relationship between the amount of $Me^{II}F_2$ (value d) of the $BaF_2.BaX_2.0.02MgF_2.dMe^{II}F_2:0.0005Ln$ phosphor included in Phosphor-II and the luminance of light emitted by the phosphor upon stimulation thereof. The data shown in FIG. 5 is one measured for the phosphor wherein X, $Me^{II}$ and Ln are bromine, calcium and divalent europium, respectively (viz., the $BaF_2.BaBr_2.0.02MgF_2.dCaF_2:0.0005Eu^{2+}$ phosphor). The measurement of the luminance of emission was performed in the same manner as described in FIG. 1. In FIG. 5, the luminance of emission (ordinate axis) is represented by the relative value with respect to that of the conventional $BaF_2.BaX_2.0.02MgF_2:0.0005Ln$ in which $Me^{II}F_2$ is not incorporated (viz., the $BaF_2.BaBr_2.0.02MgF_2:0.0005Eu^{2+}$ phosphor) defined to be 100.

As is clear from FIG. 5, when the value d is $0 \leq d \leq 1.2$, the $BaF_2.BaX_2.0.02MgF_2.dMe^{II}F_2:0.0005Ln$ phosphor emits light of higher luminance than the conventional $BaF_2.BaX_2.0.02MgF_2:0.0005Ln$ Phosphor upon stimulation thereof. In particular, when the value d is $0.001 \leq d \leq 0.1$, the $BaF_2.BaX_2.0.02MgF_2.dMe^{II}F_2:0.0005Ln$ phosphor emits light of markedly high luminance upon stimulation thereof.

Although FIG. 5 shows the data measured for the $BaF_2.BaBr_2.0.02MgF_2.cCaF_2:0.005Eu^{2+}$ phosphor as described above, it was confirmed that the results similar to that shown in FIG. 5 were also obtained with respect to other phosphors included in the $BaF_2.BaX_2.0.02MgF_2.dMe^{II}F_2:0.0005Ln$ phosphor. Further, it was confirmed that the results similar to that shown in FIG. 5 were also obtained with respect to other phosphors included in Phosphor-II wherein $Me^IF$ and/or $Me^{III}F_3$ was incorporated together with $Me^{II}F_2$.

FIG. 6 is a graph showing the relationship between the amount of $Me^{III}F_3$ (value e) of the $BaF_2.BaX_2.0.045MgF_2.eMe^{III}F_3:0.005Ln$ phosphor included in Phosphor-II and the luminance of light emitted by the phosphor upon stimulation thereof. The data shown in FIG. 6 is one measured for the phosphor wherein X, $Me^{III}$ and Ln are bromine, aluminum and divalent europium, respectively (viz., the $BaF_2.BaBr_2.0.045MgF_2.eMe^{III}F_3:0.0005Eu^{2+}$ phosphor). The measurement of the luminance of emission (ordinate axis) is represented by the relative value with respect to that of the conventional $BaF_2.BaX_2.0.045MgF_2:0.0005Ln$ phosphor in which $Me^{III}F_3$ is not incorporated (viz., the $BaF_2.BaBr_2.0.045MgF_2:0.0005Eu^{2+}$ phosphor) defined to be 100.

As is clear from FIG. 6, when the value e is $0 \leq e \leq 0.03$, the $BaF_2.BaX_2.0.045MgF_2.eMe^{III}F_3:0.0005Ln$ phosphor emits light of higher luminance than the conventional $BaF_2.BaX_2.0.045MgF_2:0.0005Ln$ phosphor upon stimulation thereof. In particular, when the value e is $0.0005 \leq e \leq 0.01$, the $BaF_2.BaX_2.0.045MgF_2.eMe^{III}F_3:0.0005Ln$ phosphor emits light of markedly high luminance upon stimulation thereof.

Although FIG. 6 shows the data measured for the $BaF_2.BaBr_2.0.045MgF_2.eAlF_3:0.0005Eu^{2+}$ phosphor as described above, it was confirmed that the results similar to that shown in FIG. 6 were also obtained with respect to other phosphors included in the $BaF_2.BaX_2.0.045MgF_2.eMe^{III}F_3:0.0005Ln$ phosphor. Further, it was confirmed that the results similar to that shown in FIG. 6 were also obtained with respect to other phosphors included in Phosphor-II wherein $Me^IF$ and/or $Me^{II}F_2$ was incorporated together with $Me^{III}F_3$.

From the above description referring to FIGS. 4 to 6, it is concluded that the values c, d and e of Phosphor-II are numbers satisfying the conditions of $0 \leq c \leq 0.9$, $0 \leq d \leq 1.2$, $0 \leq e \leq 0.03$ and $c+d+e \neq 0$. The numbers c, d and e should preferably satisfy the conditions of $0.01 \leq c \leq 0.2$, $0.001 \leq d \leq 0.1$ and $0.0005 \leq e \leq 0.01$, respectively.

In the phosphor of the present invention, the ranges of the amounts of $BaX_2$ and $MgF_2$ (the ranges of values a and b, respectively) which constitute the host material of the phosphor together with at least one of $Me^IF$, $Me^{II}F_2$ and $Me^{III}F_3$ are the same as those of the conventional rare earth element activated divalent metal fluorohalide phosphor. Further, the range of amount of Ln (the range of value f) which is the activator of the phosphor is the same as that of the conventional rare earth element activated divalent metal fluorohalide phosphor. That is, the values a, b and f are $0.90 \leq a \leq 1.05$, $0 \leq b \leq 1.2$ and $10^{-6} \leq f \leq 0.03$, respectively. From the viewpoint of the luminance of light emitted by the phosphor upon stimulation thereof, the values a, b and f are preferably $0.95 \leq a \leq 1.02$, $0.005 \leq b \leq 0.2$ (when $MgF_2$ is incorporated in the phosphor) and $10^{-4} \leq f \leq 0.01$, respectively.

As described hereinabove, the phosphor of the present invention emits light of higher luminance than the conventional rare earth element activated divalent metal fluorohalide phosphor when stimulated by light of wavelength ranging from 450 to 800 nm after exposure to ionizing radiations such as X-rays or γ-rays, ultraviolet rays, cathode rays, or the like. Accordingly, the radiation image storage panel employing the phosphor of the present invention has a high sensitivity than the radiation image storage panel employing the conventional rare earth element activated divalent metal fluorohalide phosphor. Further, the phosphor of the present invention emits thermoluminescent light of high luminance when heated after exposure to ionizing radiations, ultraviolet rays, cathode rays, or the like and accordingly, can be used in a thermoluminescent dosimeter, etc.

The present invention will hereinbelow be described referring to an example.

EXAMPLE

The following 41 kinds of combinations of raw materials were weighed out and each combination was mixed well by means of a ball mill to prepare 41 kinds of raw material mixtures (1) to (41).

(1) 175.3 grams (1 mol) of $BaF_2$, 297.1 grams (1 mol) of $BaBr_2$, 5.2 grams (0.2 mols) of LiF and 0.129 grams (0.0005 mols) of $EuCl_3$ (2) 175.3 grams (1 mol) of $BaF_2$, 297.1 grams (1 mol) of $BaBr_2$, 4.7 grams (0.1 mols) of $BeF_2$ and 0.129 grams (0.0005 mols) of $EuCl_3$ (3) 175.3 grams (1 mol) of $BaF_2$, 294.1 grams (0.99 mols) of $BaBr_2$, 0.25 grams (0.003 mols) of $AlF_3$ and 0.026 grams (0.0001 mols) of $EuCl_3$ (4) 175.3 grams (1 mol) of $BaF_2$, 297.1 grams (1 mol) of $BaBr_2$, 3.9 grams (0.05 mols) of $CaF_2$ and 0.052 grams (0.0002 mols) of $EuCl_3$ (5) 175.3 grams (1 mol) of $BaF_2$, 297.1 grams (1 mol) of $BaBr_2$, 12.6 grams (0.1 mols) of $SrF_2$ and 0.052 grams (0.0002 mols) of $EuCl_3$ (6) 175.3 grams (1 mol) of $BaF_2$, 297.1 grams (1 mol) of $BaBr_2$, 0.98 grams (0.005 mols) of $LaF_3$ and 0.052 grams (0.0002 mols) of $EuCl_3$ (7) 175.3 grams (1 mol) of $BaF_2$, 294.1 grams (0.99 mols) of $BaBr_2$, 0.26 grams (0.01 mols) of LiF, 0.42 grams (0.01 mols) of NaF and 0.077 grams (0.0003 mols) of $EuCl_3$ (8) 175.3 grams (1 mol) of $BaF_2$, 291.2 grams (0.98 mols) of $BaBr_2$, 2.4 grams (0.05 mols) of $BeF_2$, 3.9 grams (0.05 mols) of $CaF_2$ and 0.077 grams (0.0003 mols) of $EuCl_3$ (9) 175.3 grams (1 mol) of $BaF_2$, 294.1 grams (0.99 mols) of $BaBr_2$, 0.52 grams (0.02 mols) of LiF, 0.17 grams (0.002 mols) of $AlF_3$ and 0.129 grams (0.0005 mols) of $EuCl_3$ (10) 175.3 grams (1 mol) of $BaF_2$, 297.1 grams (1 mol) of $BaBr_2$, 0.26 grams (0.01 mols) of LiF, 15.6 grams (0.2 mols) of $CaF_2$, 0.08 grams (0.001 mols) of $AlF_3$ and 0.129 grams (0.0005 mols) of $EuCl_3$ (11) 175.3 grams (1 mol) of $BaF_2$, 210.3 grams (1.01 mols) of $BaCl_2$, 4.2 grams (0.1 mols) of NaF and 0.104 grams (0.0005 mols) of $EuF_3$ (12) 175.3 grams (1 mol) of $BaF_2$, 208.2 grams (1 mol) of $BaCl_2$, 0.26 grams (0.01 mols) of LiF, 12.6 grams (0.1 mols) of $SrF_2$ and 0.104 grams (0.0005 mols) of $EuF_3$ (13) 175.3 grams (1 mol) of $BaF_2$, 212.4 grams (1.02 mols) of $BaCl_2$, 7.8 grams (0.1 mols) of $CaF_2$ and 0.033 grams (0.0001 mols) of $Ce(NO_3)_3$ (14) 175.3 grams (1 mol) of $BaF_2$, 237.7 grams (0.8 mols) of $BaBr_2$, 39.6 grams (0.19 mols) of $BaCl_2$, 2.4 grams (0.05 mols) of $BeF_2$, 0.08 grams (0.001 mols) of $AlF_3$ and 0.104 grams (0.0005 mols) of $EuF_3$ (15) 175.3 grams (1 mol) of $BaF_2$, 208.2 grams (1 mol) of $BaCl_2$, 1.3 grams (0.01 mols) of $GaF_3$, 0.026 grams (0.0001 mols) of $EuCl_3$ and 0.005 grams (0.00002 mols) of $TbCl_3$ (16) 175.3 grams (1 mol) of $BaF_2$, 297.1 grams (1 mol) of $BaBr_2$, 1.5 grams (0.01 mols) of $YF_3$, 0.042 grams (0.0002 mols) of $EuF_3$ and 0.007 grams (0.00002 mols) of $Ce(NO_3)_3$ (17) 175.3 grams (1 mol) of $BaF_2$, 291.2 grams (0.98 mols) of $BaBr_2$, 0.08 grams (0.001 mols) of $AlF_3$, 0.13 grams (0.001 mols) of $GaF_3$, 0.026 grams (0.0001 mols) of $EuCl_3$ and 0.0025 grams (0.00001 mols) of $TbCl_3$ (18) 175.3 grams (1 mol) of $BaF_2$, 391.1 grams (1 mol) of $BaI_2$, 4.7 grams (0.1 mols) of $BeF_2$ and 0.209 grams (0.001 mols) of $EuF_3$ (19) 175.3 grams (1 mol) of $BaF_2$, 285.2 grams (0.96 mols) of $BaBr_2$, 11.7 grams (0.03 mols) of $BaI_2$, 0.52 grams (0.02 mols) of LiF and 0.077 grams (0.0003 mols) of $EuCl_3$ (20) 175.3 grams (1 mol) of $BaF_2$, 288.2 grams (0.97 mols) of $BaBr_2$, 11.7 grams (0.03 mols) of $BaI_2$, 0.26 grams (0.01 mols) of LiF, 0.78 grams (0.01 mols) of $CaF_2$ and 0.063 grams (0.0003 mols) of $EuF_3$ (21) 175.3 grams (1 mol) of $BaF_2$, 297.1 grams (1 mol) of $BaBr_2$, 1.2 grams (0.02 mols) of $MgF_2$, 1.8 grams (0.04 mols) of LiF and 0.129 grams (0.0005 mols) of $EuCl_3$ (22) 175.3 grams (1 mol) of $BaF_2$, 297.1 grams (1 mol) of $BaBr_2$, 1.2 grams (0.02 mols) of $MgF_2$, 0.42 grams (0.01 mols) of NaF and 0.129 grams (0.0005 mols) of $EuCl_3$ (23) 175.3 grams (1 mol) of $BaF_2$, 282.2 grams (0.95 mols) of $BaBr_2$, 1.2 grams (0.02 mols) of $MgF_2$, 0.78 grams (0.01 mols) of $CaF_2$ and 0.129 grams (0.0005 mols) of $EuCl_3$ (24) 175.3 grams (1 mol) of $BaF_2$, 297.1 grams (1 mol) of $BaBr_2$, 1.2 grams (0.02 mols) of $MgF_2$, 0.47 grams (0.01 mols) of $BeF_2$ and 0.129 grams (0.0005 mols) of $EuCl_3$ (25) 175.3 grams (1 mol) of $BaF_2$, 303.0 grams (1.02 mols) of $BaBr_2$, 3.12 grams (0.05 mols) of $MgF_2$, 2.52 grams (0.02 mols) of $SrF_2$ and 0.129 grams (0.0005 mols) of $EuCl_3$ (26) 175.3 grams (1 mol) of $BaF_2$, 297.1 grams (1 mol) of $BaBr_2$, 0.62 grams (0.01 mols) of $MgF_2$, 0.25 grams (0.001 mols) of $AlF_3$ and 0.129 grams (0.0005 mols) of $EuCl_3$ (27) 175.3 grams (1 mol) of $BaF_2$, 297.1 grams (1 mol) of $BaBr_2$, 0.62 grams (0.01 mols) of $MgF_2$, 0.13 grams (0.001 mols) of $GaF_3$ and 0.129 grams (0.0005 mols) of $EuCl_3$ (28) 175.3 grams (1 mol) of $BaF_2$, 291.2 grams (0.98 mols) of $BaBr_2$, 3.12 grams (0.05 mols) of $MgF_2$, 0.15 grams (0.001 mols) of $YF_3$ and 0.129 grams (0.0005 mols) of $EuCl_3$ (29) 175.3 grams (1 mol) of $BaF_2$, 300.1 grams (1.01 mols) of $BaBr_2$, 0.62 grams (0.01 mols) of $MgF_2$, 0.20 grams (0.001 mols) of $LaF_3$ and 0.129 grams (0.0005 mols) of $EuCl_3$ (30) 175.3 grams (1 mol) of $BaF_2$, 297.1 grams (1 mol) of $BaBr_2$, 0.31 grams (0.005 mols) of $MgF_2$, 3.1 grams (0.07 mols) of LiF, 1.6 grams (0.02 mols) of $CaF_2$ and 0.104 grams (0.0005 mols) of $EuF_3$ (31) 175.3 grams (1 mol) of $BaF_2$, 297.1 grams (1 mol) of $BaBr_2$, 0.62 grams (0.01 mols) of $MgF_2$, 2.3 grams (0.05 mols) of LiF, 0.08 grams (0.001 mols) of $AlF_3$ and 0.104 grams (0.0005 mols) of $EuF_3$ (32) 175.3 grams (1 mol) of $BaF_2$, 297.1 grams (1 mol) of $BaBr_2$, 0.62 grams (0.01 mols) of $MgF_2$, 0.78 grams (0.01 mols) of $CaF_2$, 0.15 grams (0.001 mols) of $YF_3$ and 0.104 grams (0.0005 mols) of $EuF_3$ (33) 175.3 grams (1 mol) of $BaF_2$, 208.2 grams (1 mol) of $BaCl_2$, 0.62 grams (0.01 mols) of $MgF_2$, 1.2 grams (0.05 mols) of LiF and 0.258 grams (0.001 mols) of $EuCl_3$ (34) 175.3 grams (1 mol) of $BaF_2$, 208.2 grams (1 mol) of $BaCl_2$, 3.1 grams (0.05 mols) of $MgF_2$, 0.78 grams (0.01 mols) of $CaF_2$ and 0.258 grams (0.001 mols) of $EuCl_3$ (35) 175.3 grams (1 mol) of $BaF_2$, 208.2 grams (1 mol) of $BaCl_2$, 3.1 grams (0.05 mols) of $MgF_2$, 0.42 grams (0.005 mols) of $AlF_3$ and 0.258 grams (0.001 mols) of $EuCl_3$ (36) 175.3 grams (1 mol) of $BaF_2$, 267.4 grams (0.9 mols) of $BaBr_2$, 39.1 grams (0.1 mols) of $BaI_2$, 6.2 grams (0.1 mols) of $MgF_2$, 0.45 grams (0.01 mols) of LiF and 0.104 grams (0.0005 mols) of $EuF_3$ (37) 175.3 grams (1 mol) of $BaF_2$, 267.4 grams (0.9 mols) of $BaBr_2$, 20.8 grams (0.1 mols) of $BaCl_2$, 6.2 grams (0.1 mols) of $MgF_2$, 0.78 grams (0.01 mols) of $CaF_2$ and 0.104 grams (0.0005 mols) of $EuF_3$ (38) 175.3 grams (1 mol) of $BaF_2$, 297.1 grams (1 mol) of $BaBr_2$, 3.1 grams (0.05 mols) of $MgF_2$, 0.08 grams (0.001 mols) of $AlF_3$ and 0.033 grams (0.0001 mols) of $Ce(NO_3)_3$ (39) 175.3 grams (1 mol) of $BaF_2$, 297.1 grams (1 mol) of $BaBr_2$, 3.1 grams (0.05 mols) of $MgF_2$, 0.45 grams (0.01 mols) of LiF, 0.026 grams (0.0001 mols) of $EuCl_3$ and 0.003 grams (0.00001 mols) of $Ce(NO_3)_3$ (40) 175.3 grams (1 mol) of $BaF_2$, 267.4 grams (0.9 mols) of $BaBr_2$, 20.8 grams (0.1 mols) of $BaCl_2$, 6.2 grams (0.1 mols) of $MgF_2$, 0.78 grams (0.01 mols) of $CaF_2$, 0.129 grams (0.0005 mols) of $EuCl_3$ and 0.003 grams (0.00001 mols) of $Tb(NO_3)_3$ (41) 175.3 grams (1 mol) of $BaF_2$, 291.2 grams (0.98 mols) of $BaCl_2$, 3.1 grams (0.05 mols) of $MgF_2$, 0.45 grams (0.01 mols) of LiF, 0.03 grams (0.0001 mols) of $Ce(NO_3)_3$ and 0.003 grams (0.00001 mols) of $Tb(NO_3)_3$ Then, the raw material mixtures (1) to (41) obtained were put into respective alumina crucibles and fired in an electric furnace. The raw material mixtures (1) to (17) and (21) to (37) were fired at a temperature of 850° C. for 3 hours in a carbon vapor atmosphere. The raw material mixtures (36) to (41) were fired at a temperature of 820° C. for 3 hours in a carbon vapor atmosphere. The raw material mixtures (18) to (20) were fired at a temperature of 800° C. for 3 hours in a nitrogen gas atmosphere containing 2% of hydrogen gas. After the firing, the fired products of the mixtures (1) to (41) obtained were taken out of the furnace, cooled in the air, and then pulverized. The pulverized products (1) to (41) were sieved using a sieve of 150 mesh to obtain phosphors (1) to (41), respectively.

Then, the luminance of light emitted by phosphors (1) to (41) upon stimulation thereof was measured. The measurement of the luminance was performed by exposing each phosphor to X-rays of 80 KVp, and then stimulating each phosphor with light of 630 nm which was obtained by causing the light emitted by a xenon lamp in a spectroscope to pass through a diffraction grating.

As shown in the table below, the luminance of emission of any one of phosphors (1) to (41) upon stimulation thereof was higher than that of the corresponding conventional rare earth element activated divalent metal fluorohalide phosphor measured under the same conditions.

| Phosphor | Formula of the Phosphor | Luminance* |
|---|---|---|
| Conventional (1) | $BaF_2.BaBr_2:0.0005Eu^{2+}$ <br> $BaF_2.BaBr_2.0.2LiF:0.0005Eu^{2+}$ | 100 <br> 210 |
| Conventional (2) | $BaF_2.BaBr_2:0.0005Eu^{2+}$ <br> $BaF_2.BaBr_2.0.1BeF_2:0.0005Eu^{2+}$ | 100 <br> 130 |
| Conventional (3) | $BaF_2.0.99BaBr_2:0.0001Eu^{2+}$ <br> $BaF_2.0.99BaBr_2.0.003AlF_3:0.0001Eu^{2+}$ | 100 <br> 165 |
| Conventional (4) | $BaF_2.BaBr_2:0.0002Eu^{2+}$ <br> $BaF_2.BaBr_2.0.05CaF_2:0.0002Eu^{2+}$ | 100 <br> 130 |
| Conventional | $BaF_2.BaBr_2:0.0002Eu^{2+}$ <br> $BaF_2.BaBr_2.0.1SrF_2:0.0002Eu^{2+}$ | 100 <br> 120 |
| Conventional (5) | $BaF_2.BaBr_2:0.0002Eu^{5+}$ <br> $BaF_2.BaBr_2.0.005LaF_3:0.0002Eu^{2+}$ | 100 <br> 110 |
| Conventional (6) | $BaF_2.0.99BaBr_2:0.0003Eu^{2+}$ <br> $BaF_2.0.99BaBr_2.0.02(Li_{0.5},Na_{0.5})F:0.0003Eu^{2+}$ | 100 <br> 125 |
| Conventional (7) | $BaF_2.0.98BaBr_2:0.0003Eu^{2+}$ <br> $BaF_2.0.98BaBr_2.0.1(Be_{0.5},Ca_{0.5})F:0.0003Eu^{2+}$ | 100 <br> 120 |
| Conventional (8) | $BaF_2.0.99BaBr_2:0.0005Eu^{2+}$ <br> $BaF_2.0.99BaBr_2.0.02LiF.0.002AlF_3:0.0005Eu^{2+}$ | 100 <br> 170 |
| Conventional (9) | $BaF_2.BaBr_2:0.0005Eu^{2+}$ <br> $BaF_2.BaBr_2.0.01LiF.0.2CaF_2.0.001AlF_3:0.0005Eu^{2+}$ | 100 <br> 115 |
| Conventional (10) | $BaF_2.1.01BaCl_2:0.0005Eu^{2+}$ <br> $BaF_2.1.01BaCl_2.0.1NaF:0.0005Eu^{2+}$ | 100 <br> 110 |
| Conventional (11) | $BaF_2.BaCl_2:0.0005Eu^{2+}$ <br> $BaF_2.BaCl_2.0.01LiF.0.1SrF_2:0.0005Eu^{2+}$ | 100 <br> 120 |
| Conventional (12) | $BaF_2.1.02BaCl_2:0.0001Ce$ <br> $BaF_2.1.02BaCl_2.0.1CaF_2:0.0001Ce$ | 100 <br> 140 |
| Conventional (13) | $BaF_2.0.99Ba(Br_{0.81},Cl_{0.19})_2:0.0005Eu^{2+}$ <br> $BaF_2.0.99Ba(Br_{0.81},Cl_{0.19})_2.0.05BeF_2.0.001AlF_3:0.0005Eu^{2+}$ | 100 <br> 130 |
| Conventional (14) | $BaF_2.BaCl_2:0.0001Eu^{2+}, 0.00002Tb$ <br> $BaF_2.BaCl_2.0.01GaF_3:0.0001Eu^{2+}, 0.00002Tb$ | 100 <br> 120 |
| Conventional (15) | $BaF_2.BaBr_2:0.0002Eu^{2+}, 0.00002Ce$ <br> $BaF_2.BaBr_2.0.01YF_3:0.0002Eu^{2+}, 0.00002Ce$ | 100 <br> 120 |
| Conventional (16) | $BaF_2.0.98BaBr_2:0.0001Eu^{2+}, 0.00001Tb$ <br> $BaF_2.0.98BaBr_2.0.002(Al_{0.5},Ga_{0.5})F_3:0.0001Eu^{2+}, 0.00001Tb$ | 100 <br> 135 |
| Conventional (17) | $BaF_2.BaI_2:0.001Eu^{2+}$ <br> $BaF_2.BaI_2.0.1BeF_2:0.001Eu^{2+}$ | 100 <br> 150 |
| Conventional (18) | $BaF_2.0.99Ba(Br_{0.97},I_{0.03})_2:0.0003Eu^{2+}$ <br> $BaF_2.0.99Ba(Br_{0.97},I_{0.03})_2.0.02LiF:0.0003Eu^{2+}$ | 100 <br> 130 |
| Conventional (19) | $BaF_2.Ba(Br_{0.97},I_{0.03})_2:0.0003Eu^{2+}$ <br> $BaF_2.Ba(Br_{0.97},I_{0.03})_2.0.01LiF.0.01CaF_2:0.0003Eu^{2+}$ | 100 <br> 120 |
| Conventional (20) | $BaF_2.BaBr_2.0.02MgF_2:0.0005Eu^{2+}$ <br> $BaF_2.BaBr_2.0.02MgF_2.0.04LiF:0.0005Eu^{2+}$ | 100 <br> 112 |
| Conventional (21) | $BaF_2.BaBr_2.0.02MgF_2:0.0005Eu^{2+}$ <br> $BaF_2.BaBr_2.0.02MgF_2.0.01NaF:0.0005Eu^{2+}$ | 100 <br> 115 |
| Conventional (22) | $BaF_2.0.95BaBr_2.0.02MgF_2:0.0005Eu^{2+}$ <br> $BaF_2.0.95BaBr_2.0.02MgF_2.0.01CaF_2:0.0005Eu^{2+}$ | 100 <br> 120 |
| Conventional (23) | $BaF_2.BaBr_2.0.02MgF_2:0.0005Eu^{2+}$ <br> $BaF_2.BaBr_2.0.02MgF_2.0.01BeF_2:0.0005Eu^{2+}$ | 100 <br> 115 |
| Conventional (24) | $BaF_2.1.02BaBr_2.0.05MgF_2:0.0005Eu^{2+}$ <br> $BaF_2.1.02BaBr_2.0.05MgF_2.0.02SrF_2:0.0005Eu^{2+}$ | 100 <br> 120 |
| Conventional (25) | $BaF_2.BaBr_2.0.01MgF_2:0.0005Eu^{2+}$ <br> $BaF_2.BaBr_2.0.01MgF_2.0.03AlF_3:0.0005Eu^{2+}$ | 100 <br> 115 |
| Conventional (26) | $BaF_2.BaBr_2.0.01MgF_2:0.0005Eu^{2+}$ <br> $BaF_2.BaBr_2.0.01MgF_2.0.001GaF_3:0.0005Eu^{2+}$ | 100 <br> 105 |
| Conventional (27) | $BaF_2.0.98BaBr_2.0.05MgF_2:0.0005Eu^{2+}$ <br> $BaF_2.0.98BaBr_2.0.05MgF_2.0.001YF_3:0.0005Eu^{2+}$ | 100 <br> 107 |
| Conventional (28) | $BaF_2.1.01BaBr_2.0.01MgF_2:0.0005Eu^{2+}$ <br> $BaF_2.1.01BaBr_2.0.01MgF_2.0.001LaF_3:0.0005Eu^{2+}$ | 100 <br> 103 |
| Conventional (29) | $BaF_2.BaBr_2.0.005MgF_2:0.0005Eu^{2+}$ <br> $BaF_2.BaBr_2.0.005MgF_2.0.07LiF.0.02CaF_2:0.0005Eu^{2+}$ | 100 <br> 110 |
| Conventional (30) | $BaF_2.BaBr_2.0.01MgF_2:0.0005Eu^{2+}$ <br> $BaF_2.BaBr_2.0.01MgF_2.0.05LiF.0.001AlF_3:0.0005Eu^{2+}$ | 100 <br> 118 |
| Conventional (31) | $BaF_2.BaBr_2.0.01MgF_2:0.0005Eu^{2+}$ | 100 |

-continued

| Phosphor | Formula of the Phosphor | Luminance* |
|---|---|---|
| tional (32) | $BaF_2.BaBr_2.0.01MgF_2.0.01CaF_2.0.001YF_3$:$0.0005Eu^{2+}$ | 110 |
| Conventional (33) | $BaF_2.BaCl_2.0.01MgF_2$:$0.001Eu^{2+}$ | 100 |
| | $BaF_2.BaCl_2.0.01MgF_2.0.05LiF$:$0.001Eu^{2+}$ | 120 |
| Conventional (34) | $BaF_2.BaCl_2.0.05MgF_2$:$0.001Eu^{2+}$ | 100 |
| | $BaF_2.BaCl_2.0.05MgF_2.0.01CaF_2$:$0.001Eu^{2+}$ | 125 |
| Conventional (35) | $BaF_2.BaCl_2.0.05MgF_2$:$0.001Eu^{2+}$ | 100 |
| | $BaF_2.BaCl_2.0.05MgF_2.0.005AlF_3$:$0.001Eu^{2+}$ | 110 |
| Conventional (36) | $BaF_2.Ba(Br_{0.9}, I_{0.1})_2.0.1MgF_2$:$0.0005Eu^{2+}$ | 100 |
| | $BaF_2.Ba(Br_{0.9}, I_{0.1})_2.0.1MgF_2.0.01LiF$:$0.0005Eu^{2+}$ | 115 |
| Conventional (37) | $BaF_2.Ba(Br_{0.9}, I_{0.1})_2.0.1MgF_2$:$0.0005Eu^{2+}$ | 100 |
| | $BaF_2.Ba(Br_{0.9}, I_{0.1})_2.0.1MgF_2.0.01CaF_2$:$0.0005Eu^{2+}$ | 105 |
| Conventional (38) | $BaF_2.BaBr_2.0.05MgF_2$:$0.0001Ce$ | 100 |
| | $BaF_2.BaBr_2.0.05MgF_2.0.001AlF_3$:$0.0001Ce$ | 110 |
| Conventional (39) | $BaF_2.BaBr_2.0.05MgF_2$:$0.0001Eu^{2+}$,$0.00001Ce$ | 100 |
| | $BaF_2.BaBr_2.0.05MgF_2.0.01LiF$:$0.0001Eu^{2+}$,$0.00001Ce$ | 108 |
| Conventional (40) | $BaF_2.Ba(Br_{0.9}, Cl_{0.1})_2.0.1MgF_2$:$0.0005Eu^{2+}$,$0.00001Tb$ | 100 |
| | $BaF_2.Ba(Br_{0.9}, Cl_{0.1})_2.0.1MgF_2.0.01CaF_2$:$0.0005Eu^{2+}$, $0.00001Tb$ | 115 |
| Conventional (41) | $BaF_2.0.98BaCl_2.0.05MgF_2$:$0.0001Ce$, $0.00001Tb$ | 100 |
| | $BaF_2.0.98BaCl_2.0.05MgF_2.0.01LiF$:$0.0001Ce$, $0.00001Tb$ | 110 |

*The luminance of emission is represented by a relative value with reference to that of the conventional phosphor defined to be 100.

We claim:

1. A rare earth element activated complex halide phosphor represented by the formula $$BaF_2.aBaX_2.bMgF_2.cBeF_2.dMe^{II}F_2:eLn$$

wherein X is at least one halogen selected from the group consisting of chlorine, bromine and iodine; $Me^{II}$ is at least one divalent metal selected from the group consisting of calcium and strontium, Ln is at least one rare earth element selected from the group consisting of divalent europium ($Eu^{2+}$), cerium ($Ce^{3+}$) and terbium ($Tb^{3+}$), and a, b, c, d and e are numbers satisfying the conditions of $0.90 \leq a \leq 1.05$, $0 \leq b \leq 1.2$, $0 < c \leq 1.2$, $10^{-6} \leq e \leq 0.03$ and $0 < c+d \leq 1.2$, respectively and $BeF_2$ is present in an amount sufficient to effect a phosphor exhibiting a higher luminance than said phosphor absent $BeF_2$ when stimulated by light of a wavelength ranging from 450 to 800 nm after exposure to X-rays.

2. A rare earth element activated complex halide phosphor as defined in claim 1 wherein said d is zero.

3. A rare earth element activated complex halide phosphor as defined in claim 2 wherein said a, c, and e are $0.95 \leq a \leq 1.02$, $0.01 \leq c \leq 1.2$ and $10^{-4} \leq e \leq 0.01$, respectively.

4. A rare earth element activated complex halide phosphor as defined in claim 1 wherein said d is not zero.

5. A rare earth element activated complex halide phosphor as defined in claim 4 wherein said a, c, d and e are $0.95 \leq a \leq 1.02$, $0.01 \leq c+d 0.2$ and $10^{-4} \leq e \leq 0.01$, respectively.

* * * * *